Nov. 18, 1941.  J. H. KRAEMER  2,263,340
ARTICLE OF JEWELRY
Filed Aug. 13, 1941

Inventor:
Julius H. Kraemer
By
Attorneys.

Patented Nov. 18, 1941

2,263,340

UNITED STATES PATENT OFFICE 2,263,340

ARTICLE OF JEWELRY

Julius H. Kraemer, Pawtucket, R. I., assignor to Brier Manufacturing Company, Providence, R. I., a corporation of Rhode Island Application August 13, 1941, Serial No. 406,644

7 Claims. (Cl. 59—80)

The present invention relates to an article of jewelry and more particularly to improvements in a beaded chain adapted for use as a rosary, necklace, bracelet or the like.

One of the objects of the present invention is to provide a chain of articulated links having a bead of a suitable plastic molded on each individual link.

Another object is to provide a beaded chain of articulated links which will not tangle along its length or kink between adjacent links.

Another object is to provide a chain-link of the type indicated having closed loops at its ends with both ends of the loops sealed in the bead to strengthen the link.

Another object is to provide a chain link of the type indicated of such contour and regular dimensions as to facilitate the application of the bead thereto while held in a suitable mold.

Still another object is to provide a beaded chain of the type indicated which is of pleasing and ornamental appearance and of simple construction to adapt it for economical manufacture.

Further objects of the invention are set forth in the following specification which describes a preferred form of beaded chain, by way of example, as illustrated by the accompanying drawing. In the drawing.

Figure 1:
Fig. 1 is a side view of a beaded chain incorporating the novel features of the present invention and illustrating a bead molded on each individual link of the chain.

The beaded chains heretofore used have usually been made by inserting wires through hollow beads and curling the ends of the wire to form closed loops interlocking with corresponding loops on adjacent wires. Such beaded chains tangle and kink between adjacent beads and the curled ends are apt to pull out and break the chain when the latter is subjected to a moderate pull.

It has also been proposed to mold beads onto a chain of articulated links but such chains are so difficult to manufacture as to render their commercial production impossible. The method proposed for manufacturing such beaded chains is to provide a two-part mold having a series of cavities for molding the beads on the chain. A chain of articulated links is placed between the separable parts of the mold with the links arranged haphazardly therein. Due to the manner in which the usual commercial chain is manufactured the links do not have the same length so that the mold cannot be made to accurately fit the links. The plastic is then injected into the cavities and around the chain. Each molded bead embraces several links with no regularity as to the position of the beads on the chain. As a result the plastic injected into the cavities in the mold escapes through the interstices between adjacent links and flows along the links of the chain between the beads. A beaded chain having the plastic extruded from the beads along the links between the beads renders the chain commercially unsalable.

In accordance with the present invention a chain of specially formed interlocking links is provided with a bead of a suitable plastic molded on each individual link. Each link has such regular contour and dimensions as to adapt the connecting loops at its ends to closely fit into suittable recesses formed in a mold between adjacent bead cavities. Due to the shape and regular dimensions of the links and their close fit with the recesses in the mold between adjacent bead cavities the plastic injected into the cavities can not escape along the connecting loops of the links. The loops at the ends of the links are formed by folding the end portions of a wire blank back on itself so that the bead molded on each link seals the shank between the connecting loops and the end portions of the wire link therein to strengthen the link. The novel form and construction of the links adapts the connecting loops to be made of such small dimensions with respect to the beads that the chain will not tangle or kink between adjacent links. Furthermore, the form and construction of the links adapts a relatively strong beaded chain to be manufactured commercially.

Referring to the drawing, the beaded chain is shown as comprising a series of wire links 2 with a bead 3 on each individual link. Each chain-link 2 comprises a wire blank having a central shank portion 4 with end portions 5 and 6 folded back on the shank to provide loops 7 and 8 at the ends thereof. Preferably the loops 7 and 8 are continuously rounded from the shank 4 to the end portions 5 or 6 to provide closed loops with the end portions parallel to and in contacting engagement with the shank 4, see Fig. 2. The loops 7 and 8 of each link 2 are interlocked with corresponding loops on adjacent links to form a continuous chain.

Figure 2:
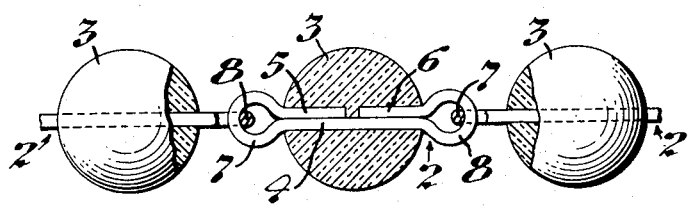
Fig. 2 is an enlarged view of several links of the chain illustrated in Fig. 1 showing the end portions of the link folded back on itself to form connecting loops and the folded end portions embedded and sealed in the molded bead between the loops.

The beads 3 molded on each individual link 2 may consist of any suitable commercial plastic to produce the desired color, luster or hardness desired. Such plastic may be injected into the mold as a semi-fluid or packed in the mold as a powder and may be caused to set by either heat, pressure or chemical reaction as is well-known by those skilled in the art of plastic molding. The beads 3 may be of any desired shape, and as illustrated in Fig. 1 some are of spherical form while others are in the form of a cylinder. It is to be understood, therefore, that the term "bead" as used in the present specification and claims is intended to include a body of any shape. As illustrated in Fig. 2, each bead 3 is molded around the shank 4 and end portions 5 and 6 of a link 2 between the loops 7 and 8. Thus the molded bead 3 seals the end portions 5 and 6 of the link therein to materially strengthen the link and prevent the loops from pulling out when a longitudinal pull is applied to the chain.

Figure 3:
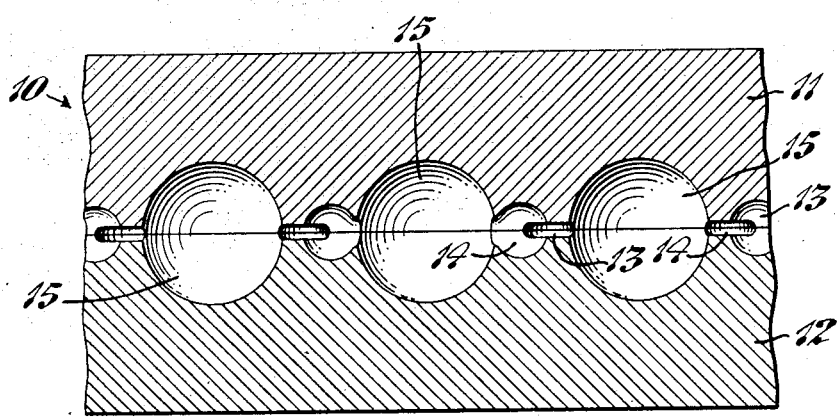
Fig. 3 is a transverse sectional view through a two-part mold showing the recesses therein for receiving the loops of adjacent links and the cavities for molding a bead around the shank of the links.

The beads 3 are preferably applied to the links 2 in a mold 10 of the type illustrated in Fig. 3. The mold 10 comprises separable parts 11 and 12 with the parts so formed as to provide a series of spaced recesses 13 and 14 of the same shape and dimensions as the loops 7 and 8 of adjacent links 2 to closely fit the same. Between the spaced recesses 13 and 14 the parts 11 and 12 of the mold 10 are further recessed to provide cavities 15 of a contour corresponding to the shape of the beads 3 to be formed. The chain of wire links 2 is then inserted between the separable parts 11 and 12 of the mold 10 with the loops 7 and 8 of each link fitted into the corresponding recesses 13 and 14 of the mold so that the shank 4 and end portions 5 and 6 of each link extend across a cavity 15 in the mold at the center thereof. The cavities 15 are then packed with the plastic to be molded or the plastic in semi-fluid form may be injected into the cavities through suitable sprues. After the plastic has set, either with or without the application of heat or pressure, the parts 11 and 12 of the mold 10 are separated and the beaded chain removed from the mold. Due to the close fit of the mold around the loops 7 and 8 of each link at the sides of the cavities 15 the plastic is prevented from flowing from the cavities whereby to form a bead 3 with a sharp outline around its entire periphery.

The cavities 15 in the mold 10 may have any desired shape and contour, such as the spherical and cylindrical forms illustrated in Fig. 1 to adapt the resulting beaded chain for use as a rosary or of the same or alternate shapes and sizes to adapt it for use as ornamental jewelry. In any case the mold is so constructed as to provide a cavity 15 for each link 2 and recesses 13 and 14 between adjacent cavities for closely fitting the loops 7 and 8 of adjacent links to prevent the flow of the plastic beyond the cavities.

Figure 4:
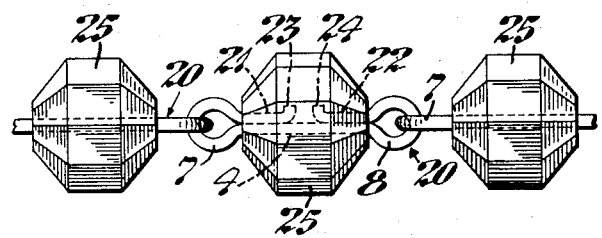
Fig. 4 is a side view of a beaded chain having links of modified construction.

In Fig. 4 a beaded chain is illustrated having a modified form of link 20. Each wire link 20 has a shank 4 and rounded loops 7 and 8, the same as in the form illustrated in Fig. 2. The end portions 21 and 22, however, have their tips 23 and 24 turned-up or folded at right-angles to the end portions. A plastic bead 25, illustrated as of polygonal shape, is then molded on the shank 4 and end portions 21 and 22 of the link in the manner explained above and the right-angular tip portions 23 and 24 act to more firmly anchor the end portions of the link in the bead.

It will now be observed from the foregoing specification that the present invention provides a novel form and construction of beaded chain which is of attractive and ornamental appearance and adapted for economical manufacture. It will also be observed that the molding of the plastic bead on each individual link provides a beaded chain adapted for commercial manufacture. It will still further be observed that the sealing of both ends of the loops of each link in the molded bead strengthens each link and provides a chain which will not kink between adjacent links.

While several forms of beaded chains incorporating the novel features of the present invention are herein shown and described it is to be understood that other modifications may be made in the contour, size and construction of the chain-links and resulting article without departing from the spirit or scope of the invention. For instance, the beaded links may be used individually as a jewelry ornament or with other jewelry articles without being connected to each other to form a chain. Therefore, without limiting myself in this respect, I claim:

1. An article of the type indicated comprising a flexible chain having a series of articulated links, and a bead of a suitable plastic molded on each individual link.

2. An article of the type indicated comprising a flexible chain having wire links with loops at their ends interlocked with similar loops of adjacent links, and a bead of a suitable plastic so molded on each individual link as to leave only the closed loops of the links extending from the sides of the bead.

3. An article of the type indicated comprising a flexible chain having articulated links, each link having a straight shank and end portions folded back on the shank to provide loops at its opposite ends interlocked with similar loops of adjacent links, and a bead of a suitable plastic molded on each individual link and sealing the shank and end portions therein to strengthen the link.

4. An article of the type indicated comprising a wire blank having end portions folded back on itself to provide loops at opposite ends thereof, and a bead of a suitable plastic molded on the wire blank wholly between its ends and sealing both ends of the loops therein.

5. A chain-link comprising a wire blank having its end portions folded back on itself to provide loops at its ends, and a bead of a suitable plastic molded on the wire blank and sealing the folded end portions therein to provide closed loops extending from the sides of the bead.

6. A chain-link comprising a wire blank having a straight shank portion with rounded loops at the ends thereof and end portions extending inwardly toward each other from the loops and positioned adjacent the shank, and a bead of a suitable plastic molded on the wire blank and sealing the shank and end portions of the link therein with the rounded loops projecting outwardly from the sides thereof.

7. A chain-link comprising a wire blank having a straight shank with rounded closed loops at the ends of the shank and end portions extending inwardly toward each other from the loops and positioned adjacent the shank, the tips of the end portions being bent at right-angles thereto, and a bead of a suitable plastic molded on the wire blank and sealing the shank and end portions of the blank therein with the rounded loops projecting outwardly from the sides thereof, said right-angular tips of the end portions firmly anchoring the latter in the bead.

JULIUS H. KRAEMER.